United States Patent [19]

Panizza

[11] Patent Number: 4,706,086

[45] Date of Patent: Nov. 10, 1987

[54] SYSTEM FOR COMMUNICATION AND AUTOMATIC SIGNALLING BETWEEN A PLURALITY OF MOTOR VEHICLES

[75] Inventor: Ettore Panizza, Turin, Italy

[73] Assignee: Fiat Auto S.p.A., Turin, Italy

[21] Appl. No.: 858,770

[22] Filed: May 2, 1986

[30] Foreign Application Priority Data

May 6, 1985 [IT] Italy .............................. 67412 A/85

[51] Int. Cl.$^4$ ........................... G08G 1/00; B60Q 1/00

[52] U.S. Cl. .................................... 340/902; 340/904; 340/905; 340/991; 340/992; 340/52 R; 340/52 F; 340/539; 455/11; 455/13; 455/54; 455/89; 364/424; 364/436; 180/167

[58] Field of Search ................................ 340/902-905, 340/52 R, 52 F, 539, 991, 992, 996, 988, 825.69, 825.72; 455/7, 9, 11, 13, 54, 56, 73, 89, 227, 228, 601; 364/424, 426, 436, 550; 180/167-169

[56] References Cited

U.S. PATENT DOCUMENTS

| | | | |
|---|---|---|---|
| 3,925,763 | 12/1975 | Wadhwani et al. | 340/539 |
| 4,083,003 | 4/1978 | Haemmis | 340/991 |
| 4,354,252 | 10/1982 | Lamb et al. | 340/539 |
| 4,449,114 | 5/1984 | Fascenda et al. | 340/988 |
| 4,455,551 | 6/1984 | Lemelson | 340/539 |

*Primary Examiner*—Donnie L. Crosland

*Attorney, Agent, or Firm*—Sughrue, Mion, Zinn, Macpeak, and Seas

[57] ABSTRACT

Each of a plurality of motor vehicles is equipped with a transmitter (1) and a receiver (2) for transmitting and receiving electromagnetic or pressure waves, detector devices (30–40) arranged to output electrical signals indicative of predetermined travelling conditions of the motor vehicle, signalling devices (6) for providing the user with perceptible messages or signals, and an electronic processing and control unit (3). The latter is arranged to assume automatically a first mode of operation when the detector devices (30–40) indicate the occurrence of one of the said travelling conditions; in this case the unit (3) automatically activates the transmitter (1) which transmits signals of a first type containing information indicative of the travelling condition detected; a second mode of operation when the receiver (2) picks up signals of the first type emitted by the transmitter (1) of another motor vehicle, in which case the unit (3) activates automatically the transmitter (1) to transmit signals of a second type, the information content of which includes the information content of the signals of the first type picked up by the receiver (2). The processing and control unit (3) is also arranged to activate the signalling devices (6) automatically each time the receiver (2) picks up signals of the second type in order to provide the user with signals or messages corresponding to the information content of the signals of the second type picked up by the receiver.

24 Claims, 5 Drawing Figures

SYSTEM FOR COMMUNICATION AND AUTOMATIC SIGNALLING BETWEEN A PLURALITY OF MOTOR VEHICLES

The subject of the present invention is a system for communication and signalling between a plurality of motor vehicles.

The object of the invention is to provide a system which allows the driver of a motor vehicle to be provided automatically and extremely quickly with information about the travelling conditions on the stretch of road on which he is about to travel.

The term "travelling conditions" is understood to mean in general both the traffic conditions (tailbacks, forced stops, "road clear" etc.) and conditions of a more specifically meteorological type (fog bands, rain, temperature etc).

This object is achieved according to the invention by means of a communication and signalling system characterised in that in each vehicle of the said plurality there is provided signal receiver means and signal transmitter means for receiving and transmitting electromagnetic or pressure waves, detector means for outputting electrical signals indicative of predetermined travelling conditions of the motor vehicle;

electric control and signalling means for providing the user with perceptible messages or signals, and an electric processing and control unit connected to the receiver and transmitter means to the detector means and to the signalling means; the processing and control unit being arranged to assume automatically (i) a first mode of operation when the detector means indicate the occurrence of one of the said travelling conditions; the unit activating the transmitter means automatically in the said first mode of operation to radiate signals of a first type containing information indicative of the detected travelling condition, (ii) a second mode of operation when the receiver means picks up signals of the first type transmitted by the transmitter means of another motor vehicle of the said plurality; the unit activating the transmitter means automatically in the second mode to radiate signals of a second type, the information content whereof includes at least in part the information content of the signals of the first type picked up by the receiver means; the said unit also being arranged to activate the signalling means automatically each time the receiver means picks up signals of the second type to provide the user with signals or messages corresponding to the information content of the said signals of the second type picked up by the receiver means.

Figure 1:
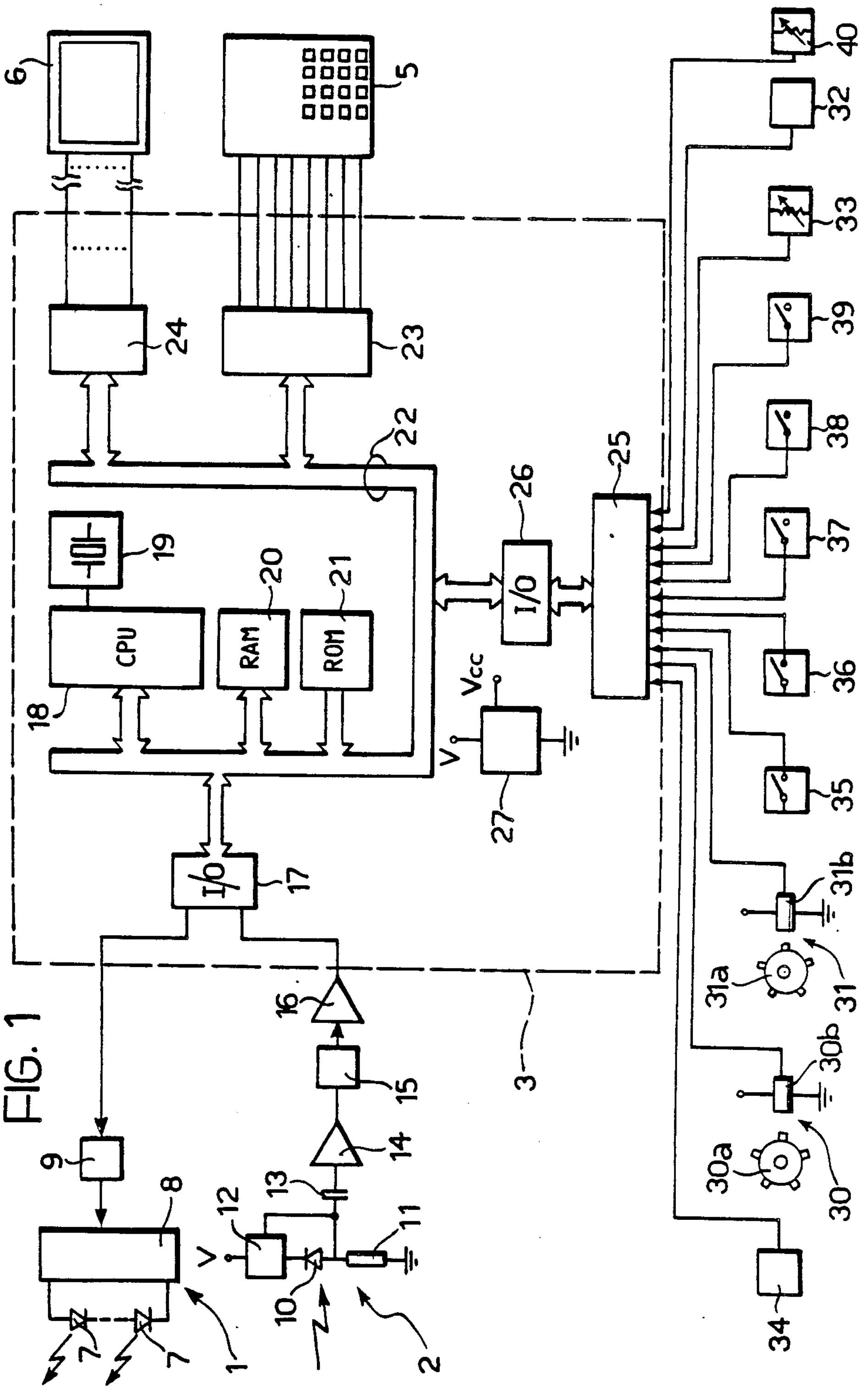

Further characteristics and advantages of the system according to the invention will become apparent from the detailed description which follows, given with reference to the appended drawings, provided purely by way of non-limiting example, in which:

FIG. 1 is a partially block schematic electrical diagram of an embodiment of apparatus installed in each of the motor vehicles forming part of the system according to the invention, and FIGS. 2 to 5 illustrate schematically conditions of operation of the system according to the invention.

The communication and signaling system according to the invention envisages the installation in a plurality of motor vehicles of apparatus of the type shown in FIG. 1. This apparatus comprises a signal transmitter device 1 and a signal receiver 2 coupled to an electronic processing and control unit generally indicated 3. To this unit is also connected a plurality of sensor or detector devices generally indicated 30–40 intended to provide the unit 3 with electrical signals indicative of travelling conditions of the motor vehicle.

A control keyboard and visual display device indicated 5 and 6 respectively are installed in the passenger compartment of the motor vehicle and connected to the processing and control unit 3.

The transmitter device 1 and the reciever 2 are intended to be mounted for example on the roof of the motor vehicle or in the external rear view mirror thereof, thereof, in order to transmit/receive signals to/from corresponding devices installed in motor vehicles travelling in the opposite direction.

In the embodiment illustrated, the transmitter device 1 is an infra-red transmitter and includes in known manner a plurality of infra-red light emitting diodes 7 controlled by a power circuit 8 which in turn is controlled by the control and processing unit 3 through a driver circuit 9.

The receiver 2 comprises at least one infra-red sensing diode 10, for example a PIN diode, disposed in series with a resistor 11 and a polarising circuit 12 of known type between a d.c. voltage supply V and earth. The anode of the diode 10 is coupled through a capacitor 13 with an amplifier 14 the output of which is connected to a band pass filter 15. The output of the latter is coupled to the input of a further amplifier 16.

Naturally, other conventional devices could be used instead of the transmitter and receiver devices illustrated, for example an ultrasonic transmitter and receiver or a radio transmitter and receiver.

The electronic processing and control unit 3 includes a CPU 18 provided with a clock signal generator (clock) 19, random access memory (RAM) circuits 20 and read-only memory devices (ROM) 21.

The unit 3 includes a bus 22 for the data and the address to which the CPU 18 and the memories 20, 21 are connected. This bus is also connected through a first input/output gate 17, to the output of the amplifier 16 and the input of the pilot circuit 9.

The bus 22 is also connected to a keyboard scanner 23 and a pilot device 24 of the signalling device 6. The latter may be constituted, for example, by a liquid crystal or light emitting diode display, by a cathode ray tube and/or possibly voice synthesizer.

The sensor and detector devices 30–40 are connected to a signal interface and conditioning circuit 25 which in turn is connected to the bus 22 through a further input/output gate 26.

The processing and control unit 3 also includes a stabilised supply 27 connected between a d.c. voltage supply V and earth, for providing at its output a stabilised voltage $V_{CC}$ for the devices of the unit 3. The group of sensor and detector devices 30–40 includes:

a sensor for sensing the forward speed of the motor vehicle 30, for example of the so-called phonic wheel type comprising a toothed wheel 30*a* associated with a wheel of the motor vehicle and a proximity pick-up 30*b* cooperating with the toothed wheel;

a sensor 31 for sensing the engine rotational speed, also, for example, of the phonic wheel type, comprising a toothed wheel 31a coupled to the shaft of the engine and a proximity pick-up 31*b*;

an odometer 32 for outputting signals indicative of the distance travelled by the motor vehicle, an engine temperature sensor 33;

a steering angle sensor 34;

a sensor 35 for sensing the operation of the windscreen wipers, constituted for example by a switch, a sensor 36 for sensing the activation of the rear fog lamps of the motor vehicle, also constituted for example by a switch;

a sensor 37 for sensing the insertion of the key in the ignition and starter switch of the motor vehicle, for example a switch;

a sensor for sensing the open/closed condition of the motor vehicle doors, indicated 38 and also constituted for example by a switch;

sensor for sensing the activation of the direction indicators of the motor vehicle, indicated 39, and a sensor 40 for sensing the ambient temperature outside the motor vehicle, for example a thermistor.

The processing and control unit 3 is arranged by entirely conventional programming techniques to assume automatically three possible modes of operation, which will be described in detail below, in dependence on the signals provided by the detector devices 30–40 and the signals picked up by the receiver device 2.

The processing and control unit 3 analyses cyclically the signals supplied to it by the sensors and detectors 30–40. When the signals provided by the devices are indicative of one of the predetermined travelling conditions which will be given by way of example below, the processing and control unit 3 assumes automatically a first mode of operation and activates the transmitter device 1 automatically, causing the radiation of signals of a first type containing information indicative of the travelling condition detected.

A certain number of travelling conditions detectable by the devices 30–40 will now be described by way of example.

The travelling condition in which the motor vehicle is made to effect a forced stop, for example as a result of a traffic bottleneck or tailback, may be identified automatically when the sensor 31 indicates that the engine of the motor vehicle is running and the signals provided by the sensor 30 indicate that the average speed of the motor vehicle has been kept between two predetermined values, for example between one and ten km/h for the last x minutes (for example 15 minutes).

A different manner of identifying a "tailback" or motor vehicles is the following. The processing and control unit 3 counts the number of times the motor vehicles stops with the engine running (information obtainable from the signals provided by the sensors 30 and 31) and decides that there is a tailback when the number of such stops counted in a predetermined time interval (for example 15 minutes) is greater than a predetermined number (for example 5 stops).

The travelling condition of free traffic flow ("road clear") may be identified in the following manner: the signals provided by the speed sensor 30 in the last y minutes (for example 15 minutes) indicate that the speed of the motor vehicle has been kept constantly above a predetermined threshold value (for example 70 km/h) in this interval.

The manner in which the processing and control unit 3 may be arranged to analyse the signals provided by the detector sensors 30–40 and the recognition of the travelling conditions are a simple matter of programming which does not present any problems for an expert.

Data indicative of respective signal messages are stored in the read only memory devices 21, corresponding to each of the predetermined travelling conditions recognisable by the processing and control unit 3.

When one of the travelling conditions is recognised, the processing and control unit 3 causes the transmission by the transmitter device 1 of coded signals indicative of the message relative to the travelling condition detected.

Figure 2:
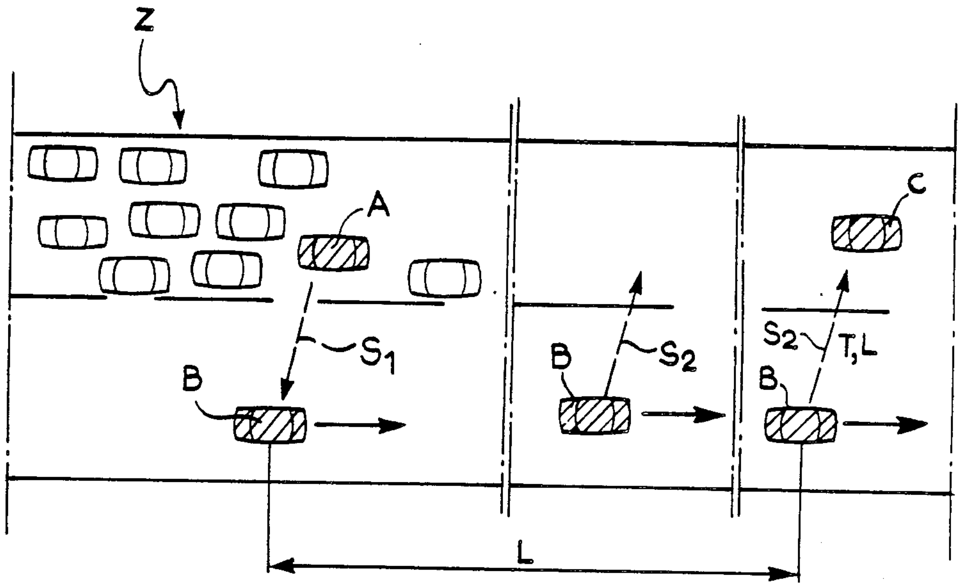

FIG. 2 is a plan view from above of a section of road with two carriageways; in the left hand part of the upper carriageway a "tailback" Z of motor vehicles proceeds slowly towards the left, effecting frequent stops and starts. In this "tailback" a motor vehicle A has apparatus of the type shown in FIG. 1: the processing and control unit 3 of this apparatus identifies the tailback travelling condition, and causes the transmission of signals of a first type $S_1$ containing information indicative of the travelling condition towards the other carriageway. In this situation, for reasons which will become clearer below, the motor vehicle A will be said to act as a "pilot" or "primary source".

Immediately a motor vehicle B which is also equipped with apparatus of the type shown in FIG. 1 passes close to the motor vehicle A, as shown in FIG. 2, the signals transmitted by the transmitter device 1 of the latter are picked up by the receiver device 2 and analyzed by the processing and control unit 3 of B. The processing and control unit 3 of the motor vehicle B is thus disposed to act in a second mode of operation, and activates the transmitter device 1 connected to it thus, causing the transmission of signals of a second type $S_2$ towards the other carriageway. As will become clearer below, the information content of the signals $S_2$ contains at least part of the information content of the signals $S_1$ transmitted by the motor vehicle A and in particular contains the information indicative of the travelling condition detected by A, that is, in the present example, the information indicative of the tailback travelling condition.

The motor vehicle B acts as a "messenger", that is, substantially as a "repeater" or secondary source.

Immediately a further motor vehicle C, also equipped with apparatus of the type shown in FIG. 1, passes close to the motor vehicle B in the carriageway in which A as travelling, the receiver device 2 of C pick up the signals transmitted by the transmitter device 1 of B. Consequently its processing and control unit 3 automatically decodes the signals received and causes the presentation to the driver of C, through the signalling device 6, of a message indicative of the travelling condition detected by A on the same carriageway as that in which C is travelling. In the situation given by way of example in FIG. 2 and described above, the motor vehicle C acts as an information "receiver". The information thus received may allow the driver of C to choose an alternative route in order to avoid joining the tailback in which vehicle A has become involved.

In general, each time the receiver 2 of a motor vehicle picks up signals of the second type, the unit 3 activates the signalling devices 6. This may occur even simultaneously with the transmission signals of the first or second type, that is even during operation as a "pilot" or "messenger".

The processing and control unit 3 is arranged to stop the transmission of signals of the first type (in operation as a "pilot") or of the signals of the second type (in operation as a "messenger") when the signals provided by the steering sensor 34 indicate that the motor vehicle has negotiated a turn having a radius of curvature less than a predetermined value.

Figure 3:
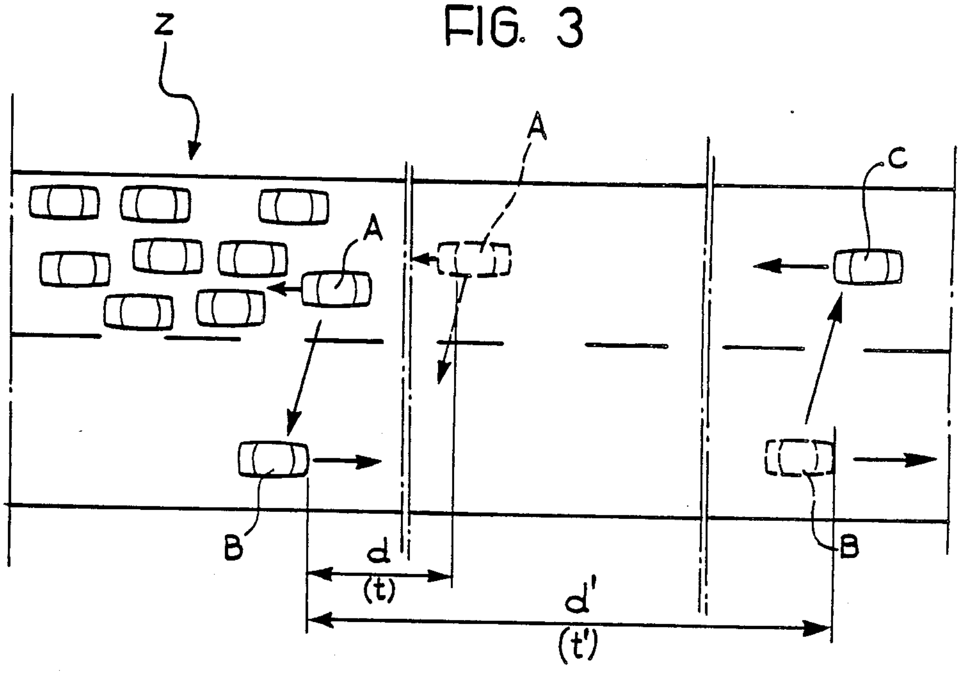
Figure 4:
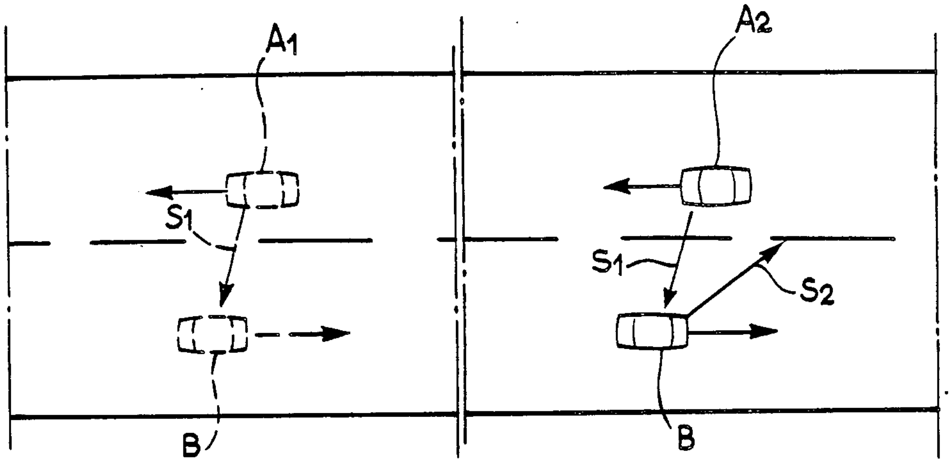

Conveniently the processing and control unit 3 may also be arranged to change automatically from the first mode of operation to the second mode of operation when the receiver device 2 connected thereto picks up signals of the said first type. With reference to FIGS. 3 and 4, the ways in which the said signals of the first and second type are generated, and their characteristics, will now be more fully described, these signals being generated and transmitted by the apparatus of FIG. 1 when it operates in the first and second modes of operation respectively.

FIG. 3 illustrates in greater detail the same situation of operation of the system according to the invention as that shown in FIG. 2. The motor vehicle A proceeding towards the left encounters a tailback Z of motor vehicles which are stationary or moving slowly, when it is in the position indicated in broken outline. The tailback situation having been recognised in the manner explained above, the control and processing unit 3 of the motor vehicle A initiates the transmission of signals of the first type, signalling the tailback travelling condition in the upper carriageway. At the same time the CPU 18 initiates a computation of the time elapsed from the moment of detection of the tailback travelling condition. The motor vehicles Z and A continue slowly with frequent stops and starts until, when the vehicle A is in the position illustrated in full outline, a motor vehicle B provided with apparatus according to FIG. 1 passes adjacent A and picks up the signals transmitted thereby. At this instant a time interval t has elapsed and the vehicle A has travelled a distance d since the moment at which the unit of this motor vehicle detected the tailback travelling condition. Conveniently, the processing and control unit 3 of the apparatus shown in FIG. 1 is also arranged, by entirely conventional programming techniques, to compute, in the first mode of operation, the time elapsed and the distance travelled since the detection of one of the said travelling conditions. The computation of the time elapsed can easily be carried out on the basis of the signals provided by the clock pulse generator 19 while the computation of the distance travelled may be effected instantaneously from the signals provided by the odometer 32. The CPU 18 may thus easily be programed so that in the first mode of operation it causes the transmission of signals of the first type including a recurring information content indicative of the travelling condition detected and a periodically updatable information content, indicative of the distance travelled and/or the time elapsed since the detection of the said travelling condition.

Thus, with reference to the situation depicted by way of example in FIG. 3, the signals of the first type picked up by the receiver of the motor vehicle B include an information content indicative of the tailback travelling condition and an updated information content indicative of the distance d and the time t.

Conveniently the processing and control unit 3 may also easily be arranged to compute periodically, in the second mode of operation, the time elapsed and the distance travelled by the motor vehicle since the receipt of signals of the first type and to transmit periodically, by means of the transmitter device 1, signals of the second type also including a recurring content substantially corresponding to the recurring content of the signals of the first type picked up, and a periodically updated information content indicative of the distance travelled and/or the time elapsed from the receipt of the signals of the first type. Turning to the example of FIG. 3, the processing and control unit 3 of the apparatus of the vehicle B which has received and recognised the signals transmitted by the vehicle A starts up computation of the time t′ elapsed and the distance d′ travelled from the moment at which it picked up the signals of the first type (FIG. 3). The processing unit 3, in the second mode of operation, at the instant of receipt of the signals of the first type, starts automatically the transmission of signals of the second type the periodically updated information content whereof is indicative of the time t′ elapsed since the reception of the signals of the first type $S_1$ picked up, the time of stoppage t indicated in the signals of the first type picked up, and the distance d′ travelled by the motor vehicle since the receipt of the signals of the first type less the distance d indicated in the signals of the first type received. With reference to FIG. 3, this means that when the motor vehicle B is in the position illustrated in broken outline, at which it passes adjacent the motor vehicle C, the receiver of the latter picks up signals of the second type with a recurring information content indicative of the tailback travelling condition detected by A, and an updated content indicative of the distance d′−d and of the times t and t′.

These latter three items of data are decoded by the processing and control unit 3 of the vehicle C which then controls the presentation on the signalling device 6 of corresponding indications. These indications provide the driver of C with useful information enabling him to evaluate, for example, a possible alternative route which would allow his to avoid the obstacle represented by the tailback detected by A.

In addition to the travelling conditions described above, the processing and control unit 3 may be arranged to "recognise" (on the basis of signals provided by the detector devices 30–40) further travelling conditions, and in particular conditions affecting both directions of travel on a given roadway on which a vehicle is travelling such as, for example, snow or rain or fog banks.

The condition of travellng in rain is identified on the basis of the signal provided by the sensor 35 for sensing the activation of the windscreen wiper devices.

The condition of travelling in a fog bank may for example be identified by analysis of the signals provided by the speed sensor 30 and by the sensor 36 for detecting the activation of the rear fog lights; if these lights are activated and if the speed of the motor vehicle remains below a predetermined value (for example 40 km/h) for a predetermined period of time (for example 30 seconds) the processing and control unit 3 deduces that the motor vehicle is travelling in a fog bank.

When the unit 3 of a motor vehicle recognises the occurrence of one of the said travelling conditions it causes the transmission of signals of the first type indicative both of the condition recognised and of the fact at this condition belongs to the said group of further travelling conditions. When the receiver of a further motor vehicle proceeding in the opposite direction to the first picks up these signals, the unit 3 of the latter motor vehicle assumes a further mode of operation and activates the signalling devices 6 connected thereto to provide the driver with a signal or message corresponding to the travelling condition recognised by the unit 3 of the said first motor vehicle.

Conveniently although not necessarily, the processing and control unit 3 of the apparatus according to FIG. 1 may also easily be arranged so that in the second mode of operation, it causes the transmission of the said signals of the second type only when the receiver 2 connected thereto picks up signals of the first type having the same recurring information content for a predetermined number of times (for example two times) in a predetermined time interval. This device allows the probability of bogus signalling to be reduced. Thus, with reference to FIG. 4, a motor vehicle B will start to transmit signals of the second type $S_2$ on condition that it has picked up signals of the first type $S_1$ with the same recurring information content, emitted by two successive motor vehicles $A_1$ and $A_2$ proceeding in the opposite direction, at least twice in a predetermined time interval (for example three minutes).

Moreover even the activation of the signalling devices 6 may be conditional upon the repeated receipt of signals of the second type (or of the first type in the said further mode of operation) with the same recurring information content.

Conveniently, although not essentially, the processing and control unit 3 of the apparatus of the FIG. 1 may be arranged to store, for example in the memory devices 20, the number of times signals of the first type having the same recurring information content are received consecutively in the second mode of operation, and to calculate and update a reliability index for the signals of the first type in dependence on the number of times they have been received and to generate and transmit signals of the second type, the periodically-updated information content whereof contains information indictive of the value of the relaibility index. In the simplest case, this reliability index is constituted by the actual number of times signals of the first type with the same recurring information content are received consecutively.

Similarly, the processing and control unit 3 is to advantage arranged to calculate and update a second reliability index relative to the signals of the second type received, the second index being a function of the reliability index of the corresponding signals of the first type and of the number of times signals of the second type with the same recurring information content are received consecutively. In this case the processing and control unit provides the driver with the reliability index of the signals of the second type received through the signalling device 6. The driver is thus provided not only with messages or indications relative to the type of travelling condition detected further downstream but also with an index of how reliable this information is.

Typically the signal emitted by the apparatus of FIG. 1, whether of the first or of the second type, may be a serial signal encoded by the PCM technique with the following protocol by way of example:

two bits for indicating the mode of operation of the processing and control unit and hence whether the signal is of the first or of the second type, that is, whether the transmission comes from a "pilot" motor vehicle or a "messenger" motor vehicle;

n bits for identifying the travelling condition detected at any time, n bits being sufficient to distinguish between $2^n-1$ different travelling conditions; the part of the signal constituted by these n bits is the part with a recurring information content;

five bits for the (updatable) indication of the distance travelled d or d'-d;

five bits for the indication of the elapsed time t defined above;

five bits for the time t';

five bits for indication of the value of the reliability index.

In this protocol there may possibly be provided, for example, a further six bits usable to indicate (in the signals of the second type) the speed of the "messenger" motor vehicle.

Figure 5:
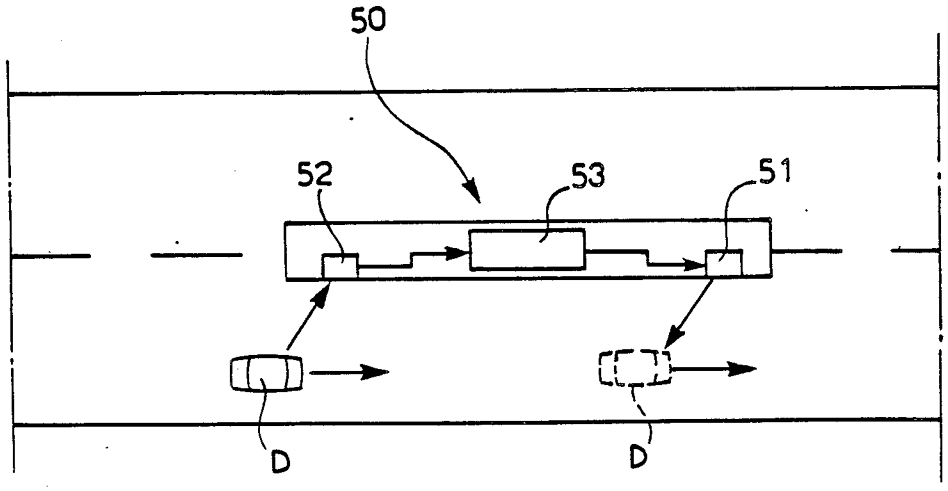

FIG. 5 illustrates schematically a further possible application of the system according to the invention. In this drawing a section of a dual carriageway road is illustrated in which a monitoring and diagnosis station generally indicated 50 is installed between the carriageways. This station comprises a receiver device 52 for picking up signals radiated by the transmitter device 1 installed in a motor vehicle D provided with apparatus according to FIG. 1 and passing adjacent the station 50, as shown in FIG. 5. The station 50 further includes a transmitter device 51 downstream of the receiver device 52 in the direction of advance of the motor vehicle D. This transmitter is arranged to send out signals which can be picked up by the receiver device 2 with which the motor vehicle D is provided. The transmitter device 51 and the receiver 52 are connected to a processing and diagnosis unit 53 the functions of which will be described below.

The processing and control unit 3 according to FIG. 1 may easily be arranged to assume a fourth mode of operation when the user imparts a predetermined manual command to it, for example by means of the keyboard 5; in this fourth mode of operation, the unit 3 activates the transmitter device 1 to transmit signals of a third type indicative of the operating conditions of the engine of the motor vehicle indicated by several of the detector sensors 30–40 indicated above or by further devices not illustrated and possibly connected to the processing and control unit 3. All the signals of the third type, when picked up by the transmitter device 52 of a monitoring and diagnosis station 50, are passed to the processing and diagnosis unit 53 which processes them and generates corresponding diagnosis signals containing information on the state of efficiency of the vehicle. These diagnosis signals are re-transmitted to the motor vehicle through the transmitter 51. The processing and control unit 3 in the said mode of operation activates the signalling device 6 to present the user with indications or messages corresponding to the information content of the diagnosis signals received.

I claim:

1. A system for communication and signalling between a plurality of motor vehicles including in each motor vehicle of the said plurality:

signal receiver means and signal transmitter means for receiving and transmitting electromagnetic or pressure waves respectively;

detector means for outputting electrical signals indicative of predetermined travelling conditions of the motor vehicle;

electric control and signalling means for providing the user with perceptible messages or signals; and an electrical processing and control unit connected to the receiver and transmitter means to the detector means and to the signallng means; the processing and control unit being arranged to assume automatically (i) a first mode of operation when the detector means indicate the occurence of one of the said travelling conditions; the unit activating the transmitter means automatically in the said first mode of operation to radiate signals of a first type containing information indicative of the detected travelling conditions, (ii) a second mode of operation when the receiver means picks up signals of the first type transmitted by the transmitter means of another motor vehicle of the said plurality; the unit activating the transmitter means automatically in the second mode to radiate signals of a second type, the information content thereof includes at least in part the information content of the signals of the first type picked-up by the receiver means;

and to activate the signalling means automatically each time the receiver means picks up signals of the said second type, to provide the user with a signal or a message corresponding to the information content of the signals of the second type picked up by the receiver means.

2. A system according to claim 1, wherein the detector means are arranged to output electrical signals indicative of further predetermined travelling conditions of the motor vehicle and the said unit is also arranged to assume a further mode of operation when the receiver means pick up signals of the first type indicative of one of the said further travelling conditions; the unit activating the signalling means connected thereto in the said further mode of operation to provide the user with a signal or message corresponding to the travelling condition indicated in the signals of the first type picked up by the receiver means.

3. A system according to claim 1, wherein the detector means include a sensor for sensing the speed of the motor vehicle and an odometer and in that the processing and control unit includes a clock signal generator.

4. A system according to claim 3, wherein the processing and control unit is arranged to compute periodically, in the said first mode of operation, the time elapsed and the distance travelled by the motor vehicle from the detection of one of the said travelling conditions of the motor vehicle, on the basis of the signals provided by the odometer and by the clock signal generator and to cause the transmission of signals of the first type including a recurring information content indicative of the travelling condition detected, and a periodically updated information content, indicative of the distance travelled and/or of the time which has elapsed since the detection of the said travelling condition.

5. A sytem according to claim 4, wherein the processing and control unit is arranged, in the said second mode of operation, to compute periodically the time which has elapsed and the distance travelled by the motor vehicle since the reception of the signals of the first type, and to cause the periodic transmission of the signals of the said second type including a recurring content substantially corresponding to the recurring content of the signals of the first type pickedup, and a periodically updated information content indicative of the distance travelled and/or the time which has elapsed since the reception of the signals of the first type.

6. A system according to claim 3, wherein the processing and control unit is arranged, in the said second mode of operation, to cause the transmission of the signals of the second type only when the receiver means picks up, in a predetermined time interval, signals of the first type having the same recurring information content for a predetermined number of times.

7. A system according to claim 1, further including an electrical steering sensor connected to the processing and control unit; the unit being arranged to interrupt the transmssion of the signals of the first and second types when the signals output by the steering sensor indicate that the motor vehicle has negotiated a turn with a radius of curvature less than a predetermined value.

8. A system according to claim 3, wherein the processing and control unit includes memory means for storing, in the second mode of operation of the unit, the number of times signals of the first type having the same recurring information conent have been received consecutively, the unit being arranged to calculate and update a reliability index of the signals of the first type in dependence upon the said number of times, and to generate signals of the second type the information content of which is indicative of this reliability index.

9. A system according to claim 8, wherein the processing and control unit is arranged to calculate and update a reliabilty index for the received signals of the second type, in dependence on the reliability index of the corresponding signals of the first type and of the number of times signals of the second type having the same recurring information content have been received consecutively and for outputting by means of the said signalling means an indication of the said reliability index for the received signals of the second type.

10. A system according to claim 1, wherein the processing and control unit is arranged to change automatically from the first to the second mode of operation when the receiver means pick up signals of the first type.

11. A system according to claim 10, wherein the electronic processing and control unit is arranged, in the said first mode of operation, to cause the transmission by means of the transmitter means of the first signals of the said first type when the signals provided by the speed sensor and by the said clock signals generator indicate that the average speed of the motor vehicle has been maintained between two predetermined values for a predetermined period of time.

12. A system according to claim 11, wherein the detector means also include an electrical sensor for sensing the engine rotational speed of the motor vehicle, connected to the processing and control unit, which is arranged, on the basis of signals provided by the speed sensor to determine the number of stoppages made by the motor vehicle with the engine running in a predetermined time interval and to allow the transmission of the said first signals of the first type when the average speed of the motor vehicle is maintained between two predetermined values in the same interval and the number of stoppages with the engine running is greater than a predetermined minimum value.

13. A system according to claim 1, wherein the processing and control unit is arranged to cause the transmission of second signals of the first type when the signals provided by the speed sensor and by the clock signal generator indicate that the speed of the vehicle has been maintained constantly above a predetermined value for the predetermined period of time.

14. A system according to claim 1, for a motor vehicle for rear fog lights, wherein the detector means further include an activation sensor for the rear fog lights, connected to the processing and control unit, which is further arranged to cause the transmission of third signals of the first type when the rear fog lights are activated and the speed of the vehicle is kept less than a predetermined value for a predetermined period of time.

15. A system according to claim 1, wherein the detector means further include an electrical activation sensor for the windscreen wiper device of the motor vehicle, connected to the processing and control unit, which is also arranged to cause the transmission of fourth signals of the first type when the windscreen wiper device has been activated for at least a predetermined period of time.

16. A system according to claim 1, also including in each motor vehicle of the said plurality of motor vehicles manually operable control means connected to the processing and control unit and a plurality of electrical sensors arranged to output electrical signals indicative of conditions of operation of the engine of the motor vehicle, also connected to the processing and control unit; the unit being arranged to assume a fourth mode of operation when the said control means are actuated; in the said fourth mode the unit activating the transmitter means to transmit signals of the third type indicative of the running conditions of the engine and the motor vehicle; the system also including monitoring and diagnosis stations locatable along roadways and provided wtih receiver devices arranged to pick up signals of the third type transmitted by a motor vehicle of the said plurality passing adjacent them, processing and diagnosis means arranged to process the signals received by the receiver devices and to generate correspondingly diagnosis signals containing information on the state of efficiency of the type, and transmitter devices connected to the processing and diagnosis unit for retransmitting the diagnosis signals to the receiver means of the motor vehicle; the processing and control unit of each motor vehicle of the plurality being arranged to activate the signalling means to provide the user with indications corresponding to the information content of the diagnosis signals received in the said fourth mode of operation.

17. A system according to claim 1, wherein the transmitter means and the receiver means comprise infra-red emitter devices and sensors respectively.

18. A system according to claim 1, wherein the transmitter means and the receiver means comprise ultrasonic emitter devices and sensors respectively.

19. A system according to claim 1, wherein the signalling means comprise a visual display device.

20. A system according to claim 1, wherein the signalling means comprise a voice synthesiser.

21. A system according to claim 17, wherein the transmitter means and receiver means are mounted in a rearview external mirror of the motor vehicle.

22. A system according to claim 17, wherein the transmitter means and receiver means are mounted on the roof of the motor vehicle.

23. A system according to claim 18, wherein the transmitter means and receiver means are mounted in a rearview exernal mirror of the motor vehicle.

24. A system according to claim 18, wherein the transmitter means and receiver means are mounted on the roof of the motor vehicle.

* * * * *